United States Patent
Powell et al.

(10) Patent No.: US 12,110,002 B2
(45) Date of Patent: Oct. 8, 2024

(54) METHOD AND SYSTEM FOR HYBRID VEHICLE POWER GENERATION

(71) Applicant: FORD GLOBAL TECHNOLOGIES, LLC, Dearborn, MI (US)

(72) Inventors: Stephen Thomas Powell, Auburn Hills, MI (US); Samuel Johnson, Garden City, MI (US); Garrett Carlson, Dearborn, MI (US); Craig Lechlitner, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 17/573,038

(22) Filed: Jan. 11, 2022

(65) Prior Publication Data

US 2023/0219554 A1   Jul. 13, 2023

(51) Int. Cl.
*B60W 20/13* (2016.01)
*B60W 10/06* (2006.01)
*B60W 10/08* (2006.01)
*B60W 10/26* (2006.01)

(52) U.S. Cl.
CPC ............ *B60W 20/13* (2016.01); *B60W 10/06* (2013.01); *B60W 10/08* (2013.01); *B60W 10/26* (2013.01); *B60W 2510/1005* (2013.01); *B60W 2510/244* (2013.01); *B60W 2555/20* (2020.02); *B60W 2710/244* (2013.01); *B60W 2756/10* (2020.02)

(58) Field of Classification Search
CPC .. B60W 20/00; B60W 10/00; B60W 2510/00; B60W 2555/00; B60W 2710/00; B60W 2756/00; B60W 20/13; B60W 10/06; B60W 10/08; B60W 10/26; B60W 2510/1005; B60W 2510/244; B60W 2555/20; B60W 2710/244; B60W 2756/10; B60W 2520/04; B60W 20/17; B60W 30/18054; B60W 50/14; B60W 2710/242; B60L 1/006; B60L 2240/662; B60L 50/10; B60L 58/13; Y02T 10/70
See application file for complete search history.

(56) References Cited

U.S. PATENT DOCUMENTS

| | | | |
|---|---|---|---|
| 5,635,817 A * | 6/1997 | Shiska | H02G 11/02 320/105 |
| 10,065,630 B2 | 9/2018 | Endo et al. | |
| 10,207,703 B2 * | 2/2019 | Uji | F02N 11/0862 |
| 2014/0214251 A1 * | 7/2014 | Sugiyama | B60L 58/20 903/930 |
| 2015/0046007 A1 | 2/2015 | Wakashiro et al. | |
| 2015/0274022 A1 | 10/2015 | Nakasako | |
| 2015/0286199 A1 * | 10/2015 | Fushiki | B60L 50/16 700/295 |
| 2015/0298568 A1 * | 10/2015 | Mitsutani | B60L 58/13 180/65.21 |
| 2016/0001772 A1 * | 1/2016 | Kato | H02J 7/00 180/65.265 |

(Continued)

*Primary Examiner* — Aniss Chad
*Assistant Examiner* — Elizabeth J Slowik
(74) *Attorney, Agent, or Firm* — David B. Kelley; Brooks Kushman P.C.

(57) ABSTRACT

Responsive to a user request, a controller operates an engine of a vehicle while parked to charge a traction battery to a target state of charge that exceeds a maximum state of charge limit, used during drive of the vehicle by an electric machine, in advance of a predefined period of time.

20 Claims, 3 Drawing Sheets

(56) References Cited

U.S. PATENT DOCUMENTS

| | | | | |
|---|---|---|---|---|
| 2017/0253127 | A1* | 9/2017 | Ciaccio | B60K 6/28 |
| 2020/0079223 | A1* | 3/2020 | Puri | B60L 58/13 |
| 2020/0361444 | A1* | 11/2020 | Sujan | F01N 11/00 |
| 2022/0219668 | A1* | 7/2022 | Sasaki | B60L 58/15 |
| 2022/0336873 | A1* | 10/2022 | Zhao | H02J 7/0063 |
| 2023/0051999 | A1* | 2/2023 | Noller | H02J 7/0048 |
| 2023/0062344 | A1* | 3/2023 | Sasaki | B60W 10/26 |
| 2023/0141525 | A1* | 5/2023 | Eitzer | H01M 10/482 |
| | | | | 320/109 |

* cited by examiner

METHOD AND SYSTEM FOR HYBRID VEHICLE POWER GENERATION

TECHNICAL FIELD

The present disclosure relates to electric power generation for a hybrid vehicle.

BACKGROUND

Some vehicles are provided with power onboard features to supply electric power to external devices. For instance, the vehicles may be provided with a hybrid drivetrain including an engine consuming conventional fuel (e.g. gasoline, diesel) and a traction battery to store electric power. A controller may be configured to operate the engine to generate electricity.

SUMMARY

A vehicle includes an engine, an electric machine, a traction battery that provides power to the electric machine, and a controller. The controller, responsive to the vehicle being in PARK and indication that starts of the engine will be prohibited for a predefined period of time during which the vehicle will remain in PARK, operates the engine to charge the traction battery to a target state of charge that exceeds a maximum state of charge limit, used during drive of the vehicle by the electric machine, in advance of the predefined period of time such that the traction battery has a state of charge that is greater than a maximum state of charge permitted during the drive for at least a portion of the predefined period of time.

A method includes, while a vehicle is in PARK and during presence of indication that starts of an engine of the vehicle will be prohibited for a predefined period of time during which the vehicle will remain in PARK, operating the engine to charge a traction battery of the vehicle to a target state of charge that exceeds a maximum state of charge limit, used during drive of the vehicle, in advance of the predefined period of time such that the traction battery has a state of charge that is greater than a maximum state of charge permitted during the drive for at least a portion of the predefined period of time A power system for a vehicle includes a traction battery, a power outlet, and a controller that, while the vehicle is parked, charges the traction battery to a target state of charge that exceeds a maximum state of charge permitted during drive of the vehicle and permits power flow from the traction battery to the power outlet without starting an engine of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system for vehicle power generation while stationary.

Figure 1:
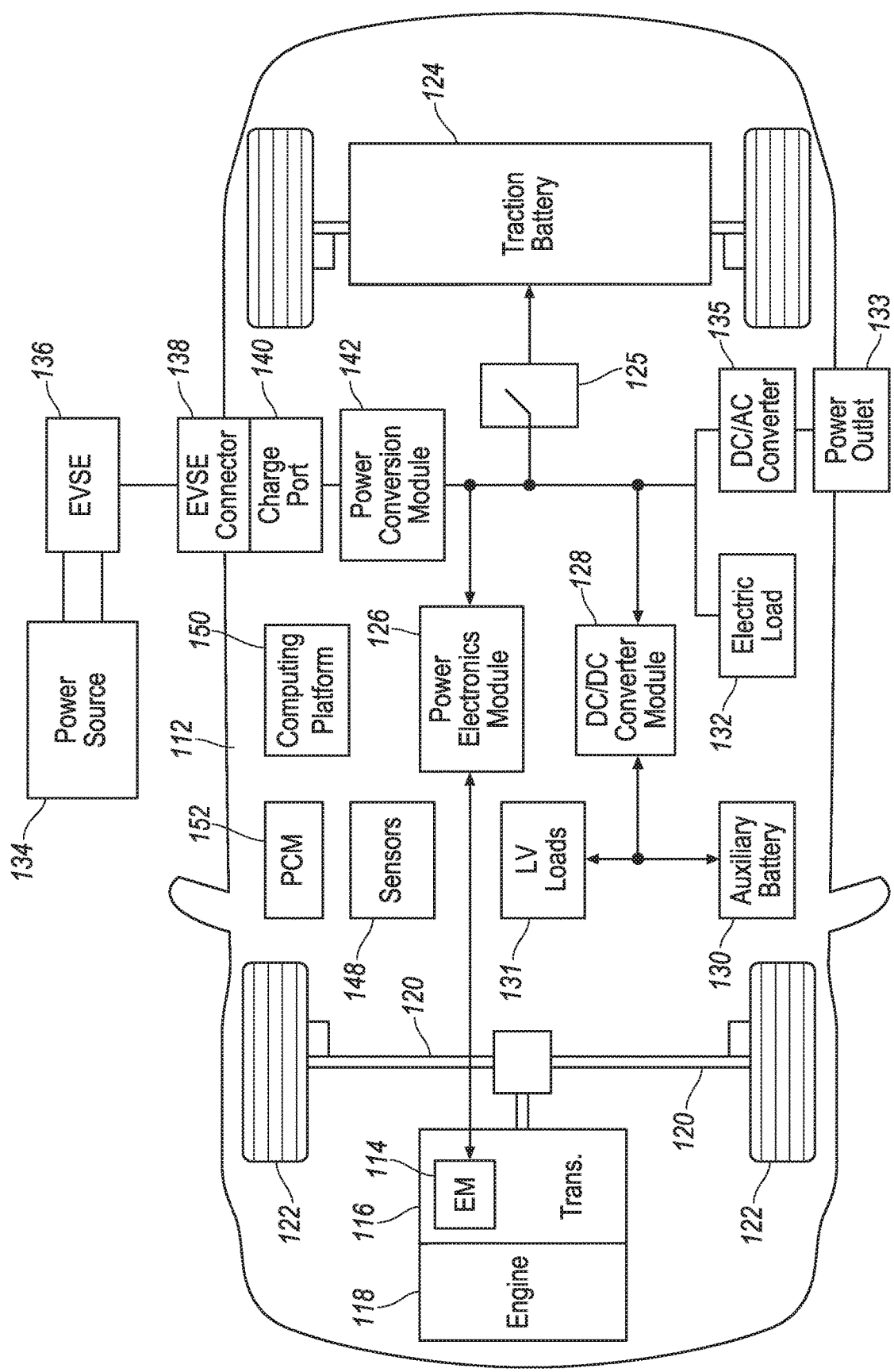
FIG. 1 illustrates an example block topology of an electrified vehicle illustrating drivetrain and energy storage components.

FIG. 1 depicts an electrified vehicle 112 that may be referred to as a plug-in hybrid-electric vehicle (PHEV), a battery electric vehicle (BEV), a mild hybrid-electric vehicle (MHEV), and/or a full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 that may be electrically coupled to the auxiliary battery 130. One or more electrical loads 132 may be coupled to the high-voltage bus/rail. The electrical loads 132 may have an associated controller that operates and controls the electrical loads 132 when appropriate. Examples of electrical loads 132 may be a fan, an electric heating element, and/or an air-conditioning compressor. The vehicle 112 may be further configured to provide electric power supply to an external power device (not shown) via one or more power outlets (power sockets) 133 through a DC/AC converter 135. The power outlet 133 may be located inside and/or outside the vehicle cabin. For instance, the power outlet 133 may be receptacles configured to correspond to NEMA connectors used in North America, although power receptacles supporting other standards may be used under essentially the same concept. The DC/AC converter 135 may be electrically coupled between the traction battery 124 and the power outlet 133 and configured to convert the high voltage DC current from the traction battery 124 into an AC current with a corresponding voltage (e.g. 110V, 220V or the like) compatible with the external power devices.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or onboard power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be provided with various sensors 148 to perform various measurements. As a few non-limiting examples, the sensors 148 may include one or more light sensors configured to measure an intensity of light of the surrounding environment of the vehicle to enable automatic vehicle lighting adjustment and determine a time of the day (e.g. day or night). The sensors 148 may further include one or more temperature sensors configured to measure an ambient temperature which may affect the heat, ventilation and air-conditioning (HVAC) usage of the vehicle 112. The sensors 148 may further include an electric sensor in communication with the power outlet 133 configured to detect the type of the external power devices connected to the power outlet 133. The sensor data may be transmitted to a controller or computing platform 150 for processing and analysis.

The vehicle 112 may be provided with a powertrain control module (PCM) 152 configured to operate the drivetrain of the vehicle 112. In the driving mode, the PCM 152 may monitor vehicle status data such as the speed and operate the engine 118, electric machine 114 and vehicle transmission 116 to adapt to various driving needs. In the regenerative mode, the PCM 152 may operate the electric machine 114 operating as a generator to convert the AC current generated by the vehicle motion to DC voltage compatible with the traction battery 124. The vehicle 112 may be further configured to support a power generating mode while stationary (i.e. parked). The PCM 152 may be configured to control and adjust the operation of the engine 118 based on a power output demand from the power outlet 133 and the SOC of the battery 124. For instance, responsive to predicting a quiet mode operation (i.e. no engine running is allowed) in a near future, the PCM 152 may increase the SOC upper threshold and start charging the traction battery 124 to increase the likelihood that the battery charge will last through the duration of the quiet mode without starting the engine 118.

Figure 2:
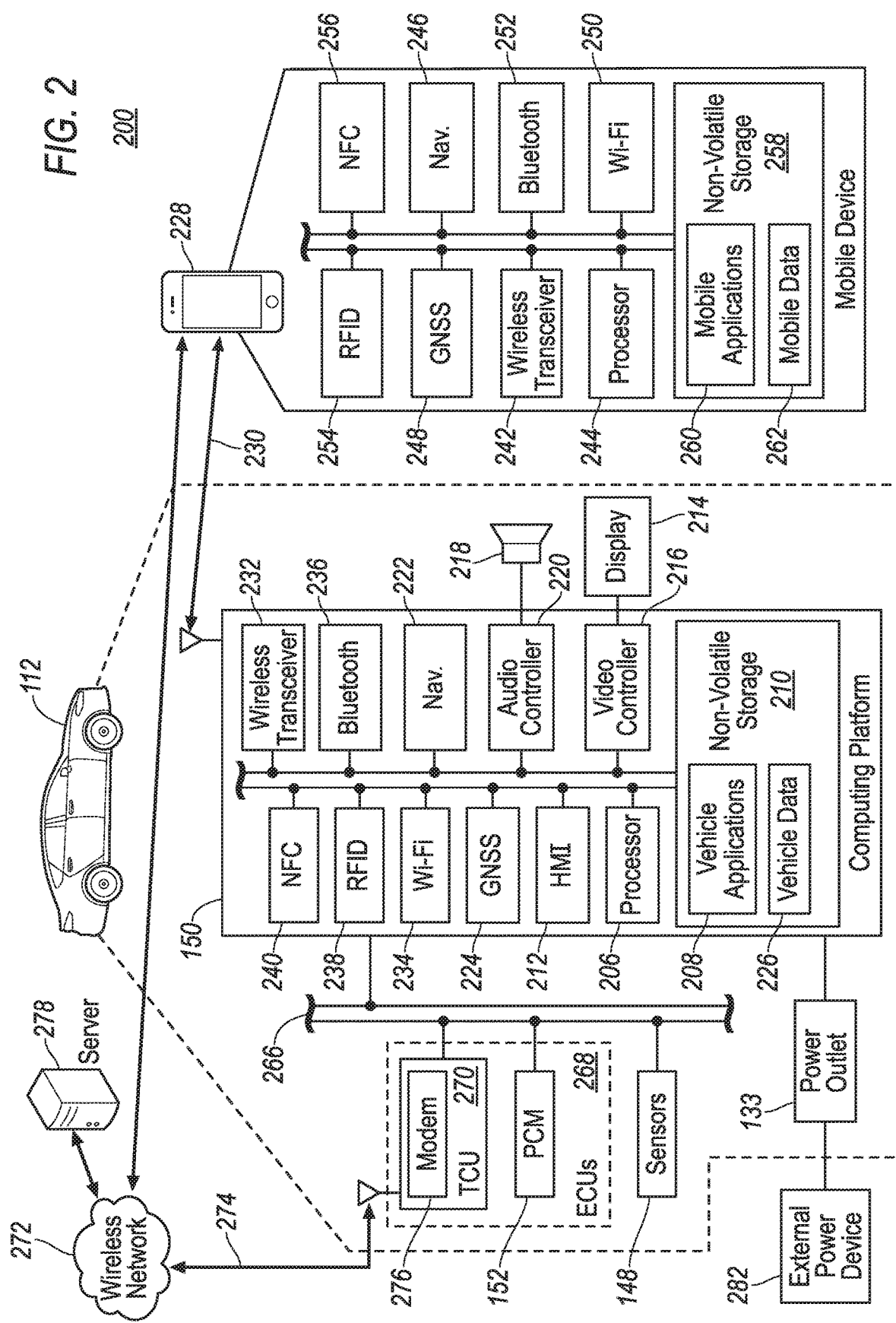
FIG. 2 illustrates an example diagram of a system controller and a battery electric control module.

Referring to FIG. 2, an example block topology of a vehicle system 200 of one embodiment of the present disclosure is illustrated. It should be noted that the illustrated system 200 is merely an example, and more, fewer, and/or differently located elements may be used. As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. As a few non-limiting examples, the display 214 may be implemented as a liquid crystal display (LCD) screen mounted on the dashboard inside the vehicle 112. Additionally or alternatively, the display 214 may be a projector mounted inside or outside the vehicle cabin configured to project an image onto a surface to interact with the vehicle user. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one of the vehicle applications 208.

The computing platform 150 may be configured to wirelessly communicate with a mobile device 228 of the vehicle users/occupants via a wireless connection 230. The mobile device 228 may be any of various types of portable computing devices, such as cellular phones, tablet computers, wearable devices, smart watches, smart fobs, laptop computers, portable music players, or other devices capable of communication with the computing platform 150. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, an ultra-wide band (UWB) controller (not shown), and be configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The mobile device 228 may be further provided with a non-volatile storage 258 to store various mobile application 260 and mobile data 262.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations. For instance, the ECUs 268 may include a telematics control unit (TCU) 270 configured to control telecommunication between vehicle 112 and a wireless network 272 through a wireless connection 274 using a modem 276. The wireless connection 274 may be in the form of various communication networks, for example, a cellular network. Through the wireless network 272, the vehicle may access one or more servers 278 to access various content for various purposes. It is noted that the terms wireless network and server are used as general terms in the present disclosure and may include any computing network involving carriers, routers, computers, controllers, circuitry or the like configured to store data and perform data processing functions and facilitate communication between various entities.

As discussed above with reference to FIG. 1, the computing platform 150 and the PCM 152 may monitor and control the operation of the power outlet 133 that is configured to supply electric power to the external power device 282. The external power device 282 is used as a general term in the present disclosure and may include various devices, apparatuses, and hardware powered by electricity. As a few non-limiting examples, the external power devices 282 may include one or more power appliances, electric lights, or the like each having a power rating. The sensors 148 may be configured to detect the type and power consumption rate of the external power devices 282 and report the detected information to the computing platform 150 and the PCM 152. Combined with the information indicative of the status of the battery 124 such as the temperature and SOC, the PCM may adjust the operation of the engine 118 and electric machine 114 to accommodate the power output demand while driving and/or stationary. Depending on the location at which the vehicle 112 is parked, noise and emission restrictions may be applied to the vehicle 112 to operate the engine 118. For instance, when the vehicle power generating feature is used on a camping site, there may be specific rules and restrictions on vehicle engine noise and emission varied by different jurisdictions. The computing platform 150 may be configured to determine a current jurisdiction using the location of the vehicle 112 from the GNSS controller 224 and obtain the rules and restrictions on noise and emission for the current jurisdiction from the server 278. The PCM 152 may be configured to support a campsite mode in which the engine operation may be adjusted based on the rules and restrictions. The rules and restrictions may include specific quiet hours such as from 10 PM to 7 AM during which vehicle engine operations are prohibited or restricted. Alternatively, the rules and restrictions may be a flexible hour such as from sunset to sun rise. In this case, the vehicle 112 may obtain the sunset and sun rise time from the server 278 and adjust the engine operation accordingly.

Figure 3:
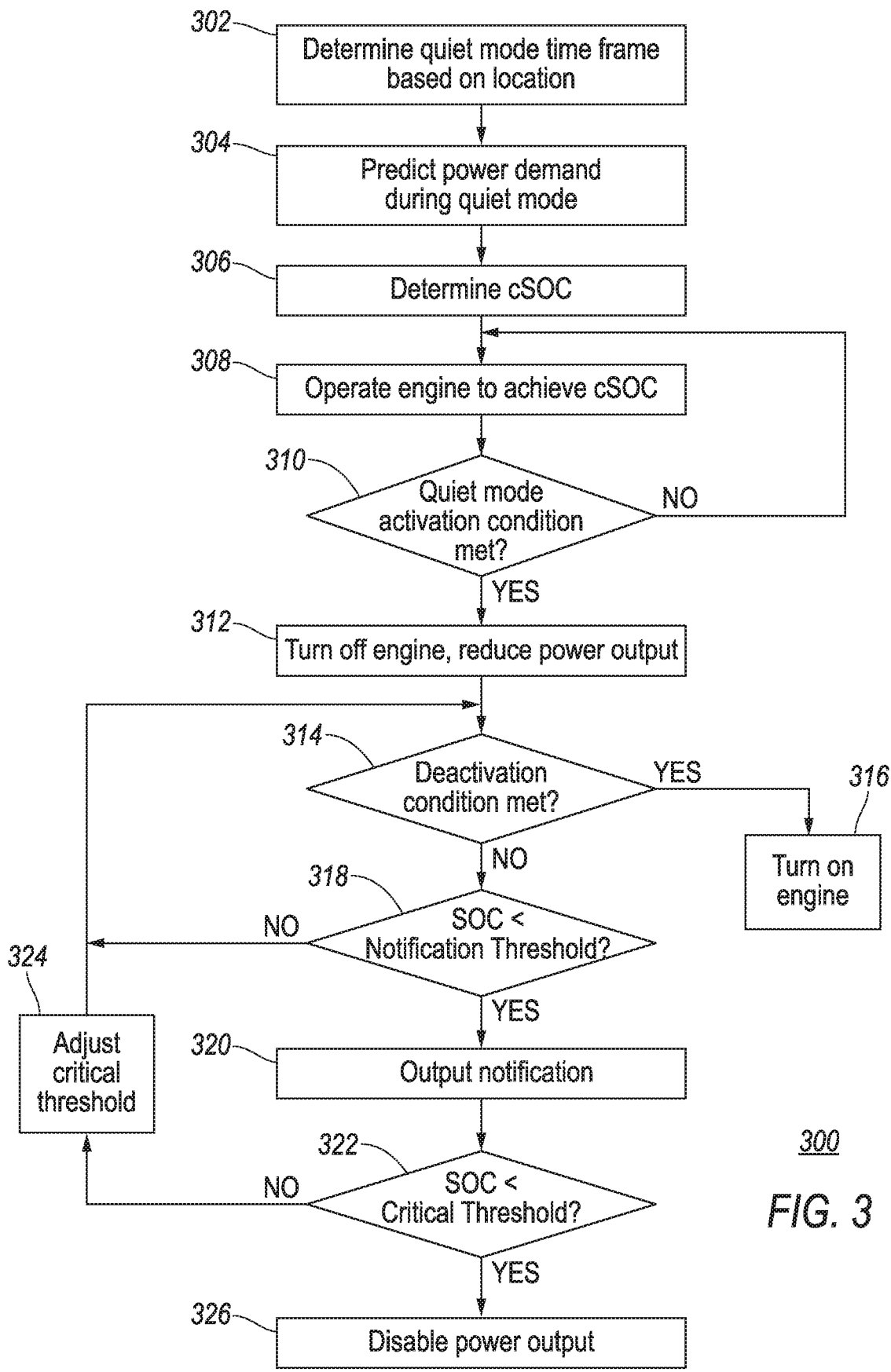
FIG. 3 illustrates an example flow diagram of a process for activating and deactivating the vehicle quiet mode.

Referring to FIG. 3, an example flow diagram of a process 300 for activating and deactivating a vehicle quiet mode is illustrated. With continuing reference to FIGS. 1 and 2, the process 300 may be implemented via one or more components of the vehicle 112. For instance, the process 300 may be individually or collectively perform by the computing platform 150 and/or the PCM 152 of the vehicle 112. For simplicity purposes, the following description will be made with reference to the computing platform 150 and the PCM 152. At operation 302, the computing platform 150 determines the quiet mode time frame duration based on location information. The quiet mode operation hours may vary from jurisdiction to jurisdiction (e.g. city, parks or the like). The computing platform 150 may obtain the rules and requirements from the server 278 using the present vehicle location from the GNSS controller 224. Additionally or alternatively, the computing platform 150 may use one or more navigation destinations from the navigation controller 222 to predict a camping location for the vehicle 112 and obtain the rules in advance while on the route. At operation 304, the computing platform 150 predicts a power demand during the quiet mode operation using information received from the one or more power sensors 148 measuring the output power of the power outlet 133. Additionally, the predicted power demand may also be affected by the weather condition during the quiet mode. For instance, vehicle users are more likely to use heaters in cold weather conditions, which may result in an increased power demand. Similarly, the air conditioning (AC) may more likely be used in hot temperatures. The computing platform 150 may further predict the power demand using temperature information received from a temperature sensor 148 and weather information at the camping site received from the server 278 via the TCU 270. With the quiet mode duration and power demand determined, at operation 306, the computing platform 150 determines a customized SOC (cSOC) calibrated to provide sufficient power supply to satisfy the power demand during the quiet mode duration. At operation 308, the PCM 152 operates the vehicle engine 118 to achieve the cSOC before the start of the quiet mode hours. The detailed implementation of the engine operation control may vary by the specific situations. For instance, if the vehicle 112 is already at the camping site where the quiet mode operation will be performed, the PCM 152 may first verify if the current SOC of the traction battery 124 is below the cSOC. In case that the answer is positive, the PCM 152 may command the engine 118 to start and charge the battery until the cSOC is reached. The PCM 152 may further monitor and adjust the battery charging power such that the battery 124 will achieve the cSOC before the starting time of the quiet hours. If, otherwise, the vehicle 112 is driving on the route to the camping site and has not yet arrived, the PCM 152 may operate the drivetrain of the vehicle 112 to achieve the cSOC before arriving at the camping site destination. For instance, the PCM 152 may less frequently allow engine pull downs to avoid operating on the electric machine alone and more aggressively using regenerative braking to recharge the battery 124. Under normal operation (e.g. driving), the traction battery 124 may be only permitted to charge up to a predefined SOC to prevent the excessive heat. The cSOC determined at operation 308 may exceed the predefined SOC under normal operation to extend the discharge duration without requiring to start the engine 118.

At operation 310, responsive to the computing platform 150 detecting a quiet mode activation condition is met, the process proceeds to operation 312 and the computing platform 150 activates the quiet mode by turning of the engine 118 and supplying electric power using the traction battery 124 alone. The quiet mode activation condition may include a quiet hour starting time for instance. Additionally or alternatively, the vehicle user may manually switch on the quiet mode via the HMI controls 212. During the vehicle quiet mode, the computing platform 150 may further reduce the power output by limiting the usage of vehicle light, entertainment features or the like to conserve energy. The computing platform 150 may further reduce or limit the power output via the power outlet 133 by only allowing a predefined external power device 282 (e.g. a refrigerator) to draw power from the traction battery 124. At operation 314, the computing platform 150 verifies if a quiet mode deactivation condition is met such as the time has passed the quiet hours and/or the user manually deactivated the quiet mode. If the answer is a yes, the process proceeds to operation 316 and the PCM 152 starts the vehicle engine 118 to charge the traction battery 124. If the deactivation condition is not met, the process proceeds to operation 318 and the computing platform 150 verifies if the current SOC of the traction battery 124 has reduced to a notification threshold (e.g. 10%). If the answer is a yes, the process proceeds to operation 320 and the computing platform 150 outputs a notification message about the current SOC to notify the vehicle user. The notification message may be in the form of video or audio output via the video controller 216 or audio controller 220. Additionally, the computing platform 150 may send a message to the mobile device 220. At operation 322, the computing platform 150 further verifies if the current SOC of the traction battery 124 has reduced to a critical threshold that is lower than the notification threshold (e.g. 3%). The critical threshold may be configured as a safe net to prevent exhaustion of the traction battery 124 to reserve sufficient charge such that the engine 118 may be started when needed. If the answer is a no, the process proceeds to operation 324 and the computing platform 150 adjusts the critical threshold using information such as the ambient temperature measured by the temperature sensor 148. The computing platform 150 may increase the critical threshold responsive to a low ambient temperature under which condition more power is required to start the engine 118. If the computing platform 150 detects the critical threshold has been reached, the process proceeds to operation 326 and the computing platform 150 disables power output via the power outlet until the engine 118 starts. The computing platform 150 may further notify the user by outputting a message via the HMI controls 212 and/or sending the message to the mobile device 228 to inform the user about the disabling of the power output.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to expense, strength, durability, life cycle expense, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising
an engine;
an electric machine;
a traction battery configured to provide power to the electric machine; and
a controller programmed to, while the vehicle is in PARK and before a predefined period of time during which engine starts will be prohibited, operate the engine to charge the traction battery to a target state of charge that exceeds a maximum state of charge limit permitted during drive of the vehicle by the electric machine.

2. The vehicle of claim 1 further comprising a power outlet configured to convey power from the traction battery during the predefined period of time.

3. The vehicle of claim 1 further comprising a power outlet, wherein the controller is further programmed to limit power flow from the traction battery to loads other than the power outlet during the predefined period of time.

4. The vehicle of claim 1, wherein the controller is further programmed to inhibit starts of the engine during the predefined period of time.

5. The vehicle of claim 1, wherein the controller is further programmed to, responsive to the state of charge falling below a floor value, generate a notification.

6. The vehicle of claim 1 further comprising a power outlet configured to convey power from the traction battery during the predefined period of time, wherein the controller is further programmed to, responsive to the state of charge falling below a floor value, prevent power flow to the power outlet.

7. The vehicle of claim 6, wherein the floor value is based on ambient temperature.

8. The vehicle of claim 1, wherein the target state of charge is based on weather in a vicinity of the vehicle.

9. A method comprising:
responsive to a vehicle being in PARK and before a predefined period of time during which engine starts will be prohibited, operating the engine to charge a traction battery of the vehicle to a target state of charge that exceeds a maximum state of charge limit permitted during drive of the vehicle by an electric machine.

10. The method of claim 9 further comprising limiting power from the traction battery to loads other than a power outlet of the vehicle during the predefined period of time.

11. The method of claim 9 further comprising inhibiting starts of the engine during the predefined period of time.

12. The method of claim 9 further comprising generating a notification indicating the state of charge has fallen below a floor value.

13. The method of claim 9 further comprising preventing power flow from the traction battery to a power outlet of the vehicle after the state of charge has fallen below a floor value.

14. The method of claim 13, wherein the floor value is based on ambient temperature.

15. The method of claim 9, wherein the target state of charge is based on weather in a vicinity of the vehicle.

16. A power system for a vehicle comprising:
a traction battery;
a power outlet; and
a controller programmed to, while the vehicle is parked and before a predefined period of time during which engine starts will be prohibited, charge the traction battery to a target state of charge that exceeds a maximum state of charge permitted during drive of the vehicle and to permit power flow from the traction battery to the power outlet without starting the engine of the vehicle.

17. The power system of claim 16, wherein the controller is further programmed to limit power flow from the traction battery to loads other than the power outlet.

18. The power system of claim 16, wherein the controller is further programmed to prevent the power flow based on a state of charge of the traction battery.

19. The power system of claim 16, wherein the target state of charge is based on weather in a vicinity of the vehicle.

20. The power system of claim 16, further comprising a wireless transceiver programmed to communicate with a mobile device,
the controller is further programmed to responsive to the state of charge of the traction battery reaches a discharge threshold while the vehicle is parked, output a message to the mobile device.

* * * * *